United States Patent [19]
Sanders et al.

[11] Patent Number: 5,193,163
[45] Date of Patent: Mar. 9, 1993

[54] TWO-LEVEL PROTOCOL FOR MULTI-COMPONENT BUS OWNERSHIP, AND IMPLEMENTATION IN A MULTI-PROCESSOR CACHE WRITE BACK PROTOCOL

[75] Inventors: Douglas E. Sanders, Framingham; Michael A. Callander, Hudson, both of Mass.

[73] Assignee: Digital Equipment Corporation, Maynard, Mass.

[21] Appl. No.: 591,197

[22] Filed: Oct. 1, 1990

[51] Int. Cl.$^5$ .................. G06F 12/00; G06F 13/00
[52] U.S. Cl. .................. 395/425; 364/DIG. 1
[58] Field of Search .......... 395/425 MS File, 400; 364/200 MS File, 900 MS File

[56] References Cited

U.S. PATENT DOCUMENTS

| | | | |
|---|---|---|---|
| 4,142,234 | 2/1979 | Bean et al. | 364/200 |
| 4,195,340 | 3/1980 | Joyce et al. | 364/200 |
| 4,802,085 | 1/1989 | Levy et al. | 364/200 |
| 5,003,463 | 3/1991 | Coyle et al. | 364/200 |
| 5,019,965 | 5/1991 | Webb, Jr. et al. | 395/550 |
| 5,025,365 | 6/1991 | Mathur et al. | 364/200 |
| 5,058,006 | 10/1991 | Durdan et al. | 395/375 |
| 5,072,369 | 12/1991 | Theus et al. | 395/425 |

*Primary Examiner*—Joseph L. Dixon
*Assistant Examiner*—Frank Asta
*Attorney, Agent, or Firm*—Denis G. Maloney; Barry Young; Ronald Myrick

[57] ABSTRACT

A method and apparatus for monitoring transactions on a system bus for invalidate requests, including a queue for storing the invalidate requests which is divided into two parts. The first part of the queue is contained within a cache controller to ensure that an invalidate request is immediately available for processing when the cache controller is otherwise idle. The second part of the queue is contained within a system interface to ensure that the system interface can detect and respond to more system transactions before the first invalidate request has been processed and to enable the system interface to be immediately aware if the entire queue is full.

15 Claims, 7 Drawing Sheets

TWO-LEVEL PROTOCOL FOR MULTI-COMPONENT BUS OWNERSHIP, AND IMPLEMENTATION IN A MULTI-PROCESSOR CACHE WRITE BACK PROTOCOL

CROSS REFERENCES

The present application is related to the following applications filed at the same time as this application:

U.S. patent application Ser. No. 07/591,198 (pending) by Michael A. Callander and Douglas Elliott Sanders, entitled A TWO-LEVEL PROTOCOL FOR MULTI-COMPONENT BUS OWNERSHIP, AND IMPLEMENTATION IN A MULTI-PROCESSOR CACHE WRITE BACK PROTOCOL;

U S. patent application Ser. No. 07/591,196 (pending), by Michael A. Callander, Linda Chao and Douglas Elliott Sanders, entitled APPARATUS FOR SUPPRESSING AN ERROR REPORT FROM AN ADDRESS FOR WHICH AN ERROR HAS ALREADY BEEN REPORTED;

U.S. patent application Ser. No. 07/591,195 by Soha Mahmoud Nadim Hassoun and Douglas Elliott Sanders, entitled AN IMPROVED PARITY GENERATOR;

U.S patent application Ser. No. 07/591,199 by Michael A. Callander, entitled WRITE-BACK CACHE WITH ECC PROTECTION; and U.S. patent application Ser. No. 07/591,186 (pending) by Douglas Elliott Sanders, Michael A. Callander and Linda Chao, entitled METHOD AND APPARATUS FOR COMPLETING A DEFERRED READ REQUEST IN THE PRESENCE OF AN ERROR.

BACKGROUND OF THE INVENTION

This invention relates to the field of multiprocessor computers with cache memories.

In recent years, great efforts have been expended to enable computers to operate at greater speeds. One method of accomplishing greater operating speeds for computers is through the use of cache memories Cache memories are random access memories (RAMS) that have faster operating speeds than main memories. In addition, cache memories are located closer to the processor, thereby enabling data to get from the cache memory to the processor more quickly than it can get from the main memory to the processor. In some implementations, there are more than one level of cache memory. One cache memory (referred to as primary cache) may reside on the processor chip, a second cache memory on another chip or chips on the same circuit board as the processor chip (referred to as secondary cache), with main memory on another circuit board or boards.

Cache memories do not contain the entire contents of main memory. Instead they contain the subset of main memory that is most likely to be used by the processor. If the processor requests a memory address not present in cache memory (referred to as a cache "miss"), the information in the requested memory address, and in other addresses nearby (referred to as a block), is brought into cache memory, and information currently present in cache memory is displaced.

Since cache memories contain only a subset of the main memory, a system must exist for recording which blocks of main memory currently reside in the cache and where in the cache memory they are stored. A number of such systems are well known in the art. These systems typically record the identity of the block in a table. Since the blocks are of a predetermined size, knowing one main memory address of a block and its position in the block (such as the first main memory address in the block), allows determination of whether a specific main memory address is present in the cache memory. A typical block size is 128 bytes.

There are two principal write policies for cache memories. According to the "write through" policy, when a processor changes data (i.e. the contents of a main memory address) and writes the new data back to the cache, it also writes the corresponding new data in main memory. According to the "write back" policy, a processor writes the new data back to main memory only when the data is displaced from the cache, when the new data is requested by another system component, or when the program has completed. Thus, a writeback system requires some method to determine when data in the cache is requested by another system component.

Another method for accomplishing greater processor speeds is to add more processors and split up the computing task among the various processors Typically, each of the processors has its own cache memory. This leads to the problem of cache coherency. Cache coherency means that all caches must have the same value for the contents of any given main memory address. To maintain cache coherency, most cache tables contain a method of indicating whether or not the information is known to be valid or not. This is commonly referred to as a "valid bit" If the valid bit contains one value (either 0 or 1), the processor can use the data immediately. If the valid bit contains the other value (1 or 0) the processor knows that the main memory address may have been changed, and therefore must request the current contents of that main memory address. There are a number of methods known in the art for determining whether the information in main memory addresses is valid or not.

In one common method, each processor module monitors all transactions on a system bus. Built into the processor module is logic which determines whether or not each transaction on the system bus requires that data that may be in the cache be declared invalid. If the processor module detects a transaction requiring data to be declared invalid, it issues an "invalidate request" to the various components of the processor module. The issuance and processing of invalidate requests will be explained in more detail in connection with the detailed description of the invention.

Since the address to be invalidated may not be in cache RAM (Random Access Memory) processing invalidate presents two problems. A significant amount of processor time may be spent attempting to perform invalidate requests on addresses that are not present in module cache. This processor time may take away from more useful processor activity. Second, invalidate requests for addresses that are not present in cache RAMS may occupy significant amounts of bandwidth on the module bus. Thus it is desirable to filter invalidate requests such that only invalidate requests for addresses that are present in the cache rams are broadcast over the module bus and are processed by the processor.

One method of filtering invalidate requests is taught in U.S. patent Application Ser. No. 07/212,416, filed Jun. 27, 1988 by Durdan, et al, entitled "Method and Apparatus for Filtering Invalidate Requests" now U.S.

Pat. No. 5,058,006 and assigned to the assignee of the present application. In Durdan et al, a technique is disclosed wherein a dedicated data path is provided between the memory interface and the cache controller logic. This dedicated path is referred to as an invalidate bus or I-bus and this bus, along with the processor bus is considered as part of the memory interface. When a write transaction (the transaction that generates an invalidate request) is detected, the memory interface communicates with the cache controller via the I-bus in order to determine whether the write transaction involves a memory location copied in the cache memory hierarchy of the CPU module. If the written location is not present anywhere in the cache memory of the CPU, the write transaction is ignored, and no invalidate is forwarded to the cache controller or CPU, and the processor bus remains available for use by the CPU. If the written location is copied in the cache memory of the CPU module, the memory interface broadcasts the write transaction information over the processor bus, where it is received by the cache controller, and the CPU to be processed as an invalidate.

An element of Durdan, et al is a FIFO (first-in-first-out) queue called an invalidate Queue. The invalidate queue is placed between the system bus and the CPU module. The CPU monitors the system bus for write transactions on the system bus. When any data write transactions is detected on the system bus, the address of that transaction is placed on one end of the CPU module's Invalidate Queue and the valid bit is set. When the CPU is able to process an invalidate, the first valid entry is removed from the other end of the Invalidate Queue and its valid bit is cleared. The address of the write transaction is checked against the contents of the cache structure, and if present, the entry corresponding to that address is marked as invalid.

U.S. patent Application Ser. No. 07/212,347, filed Jun. 27, 1988 by Callander et al filed under the title "Multi-processor Computer System Having Shared Memory and Private Cache Memories" and subsequently retitled by amendment to "Circuit and Method of Serializing Transactions in a Multi-processor Computer System" and assigned to the assignee of the present application, discloses a method of synchronizing entries in an invalidate queue and a read data queue. FIG. 2 of Callander et al shows an invalidate queue placed between a system bus interface and a CPU bus interface.

U.S. patent application Ser. No. 07/547,850 filed Jun. 29, 1990, by Chisvin et al, entitled "Combined Queue for Invalidates and Return Data in Multiprocessor System", and assigned to the assignee of the present application, discloses an invalidate queue on the interface unit.

U.S. Pat. 4,142,234, issued Feb. 27, 1979 to Bean et al, and entitled "Bias Filter Memory for Filtering Out Unnecessary Interrogations of Cache Directories in a Multiprocessor System" discloses a cache control circuit that comprises a cache directory and controls, and a Buffer Invalidate Address Stack (BIAS) and further discloses a filter memory. FIG. 1 of Bean shows the BIAS array totally contained by the cache control circuit. The filter memory records the most recent cache block address(es) that have been passed to the Buffer Invalidate Address Stack (BIAS) for interrogating the associated cache directory. Subsequent addresses remotely provided from another processor or channel that would interrogate the same cache block address are "filtered out" by not being passed to the associated BIAS. Remote processor stores, and local and remote channel stores are inputted and compared against address(es) in the filter memory. If not equal to any valid address, in the filter memory, the inputted address is recorded as a valid entry in the filter memory, and it is gated into BIAS. If equal to any valid address, the inputted address is not entered into the filter memory, and it is not gated to BIAS, so the no cache interrogation results.

U.S. Pat. No. 4,195,340, issued Mar. 25, 1980 to Joyce et al, and entitled "First In First Out Activity Queue for a Cache Store" discloses a FIFO buffer. FIG. 2 of Joyce shows the FIFO buffer as totally contained by a Replacement and Update unit. The FIFO buffer is shown as receiving data from three separate receivers, the three receivers shown as totally contained by a Bus Interface Unit.

SUMMARY OF THE INVENTION

This invention is an improved method and apparatus for the processing of invalidate requests. A queue for storing the invalidate requests is provided. The queue is divided into two parts, one part is contained within a cache controller to ensure that an invalidate request is immediately available for processing when the cache controller is otherwise idle. A second part is contained within a system interface to ensure that the system interface can detect and respond to more system transactions before the first invalidate request has been processed and to enable the system interface to be immediately aware if the entire queue is full.

A more detailed description of the invention will be facilitated by the drawings, which are described below.

DETAILED DESCRIPTION OF THE INVENTION

Figure 1:
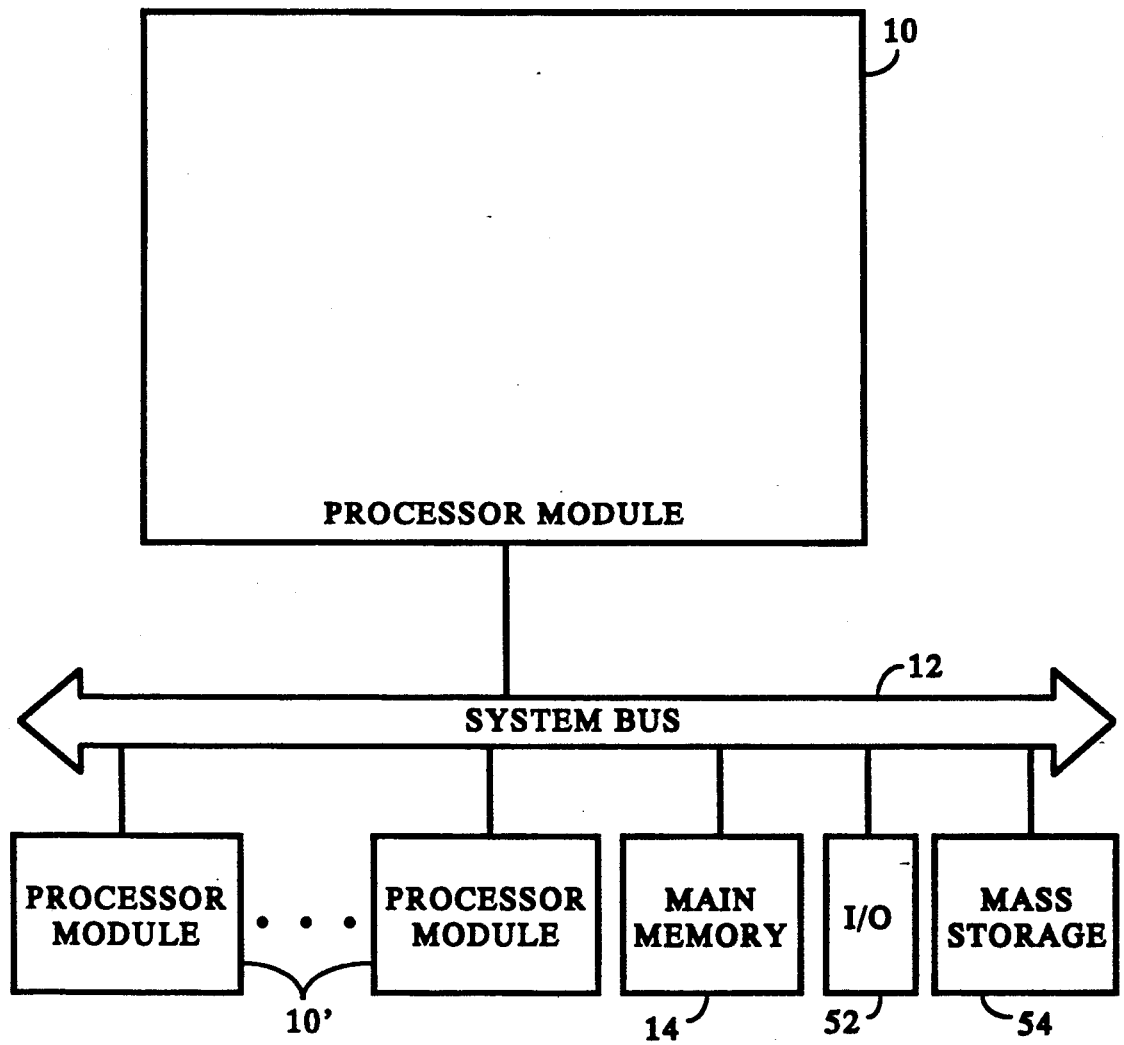
FIG. 1 is a block diagram of a typical multiprocessor computer system.

A typical multiprocessor computer system is shown in FIG. 1. Processor module 10 and other processor modules 10' are attached to a system bus 12, which is sometimes referred to as a "memory bus". Also attached to system bus 12 is main memory 14, input output (I/0) 52, and mass storage 54. Main memory 14, I/0 52, and mass storage 54 are shown as single blocks, but in a typical computer system, there will be several such devices. Also I/0 52 or mass storage 54 may be attached to system bus 12 by a separate bus (not shown).

Figure 2:
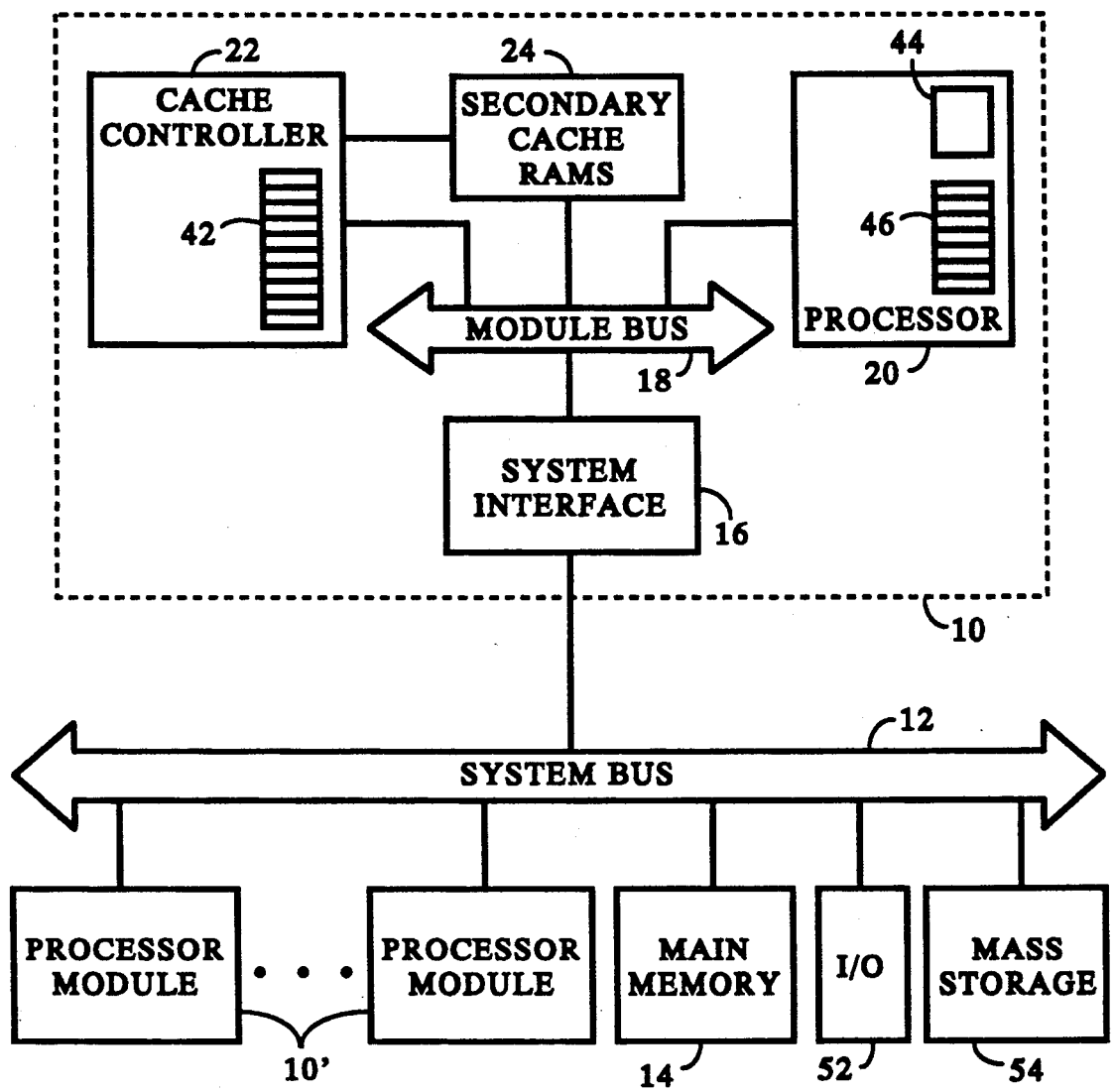
FIG. 2 is a block diagram of multiprocessor computer system of FIG. 1 with one of the processor modules shown in greater detail.

FIG. 2 shows the system of FIG. 1, with processor module 10 shown in greater detail. Processor module 10 is connected to system bus 12 by the system interface 16. System interface 16 is attached to the module bus 18. Also connected to module bus 18 are the cache controller 22, the secondary cache rams 24, and the processor 20. Cache controller 22 is also connected directly to secondary cache rams 24.

As an item is brought into secondary cache rams 24, an entry is made in a table 42 on cache controller 22. Table 42 is a set of registers that contains, among other things, a pattern of bits indicating the main memory address of each of the items in the secondary cache rams 24, and a valid bit. Primary cache 44 is a part of the processor 20. The Content of primary cache 44 is a subset of the content of secondary cache rams 24. The main memory addresses of primary cache 44 are recorded in table 46, which is a set of registers that contains, among other things, a pattern of bits indicating the main memory address of each of the items in the primary cache 44 and a system settable valid/invalid bit.

System interface 16 monitors transactions that are broadcast on system bus 12. If system interface 16 detects a transaction requiring an invalidate request or a transaction indicating that another processor has requested information that may be in cache 44, it issues an invalidate request containing, among other information, the main memory address of the item to be invalidated. The invalidate request is transmitted from system interface 16 to cache controller 22 over the module bus 18. The cache controller 22 searches table 42 to determine if the main memory address of the item to be invalidated is present in the secondary cache rams 24. If cache controller 22 determines that the main memory address of the item to be invalidated is not present in cache rams 24, no further action is taken by either cache controller 22 or system interface 16. If cache controller 22 determines that the main memory address of the item to be invalidated is in secondary cache rams 24, cache controller 22 processes the invalidate request by changing the valid bit for the entry in table 42 to "invalid". Cache controller 22 then sends the invalidate request to processor 20. If the main memory address of the item to be invalidated is in table 46, the processor changes the valid indicator of the entry in table 46 to "invalid".

Content of primary cache 44 is a subset of content of secondary cache rams 24. Therefore, if the main memory address of the item to be invalidated is not present in table 42 on the cache controller, it cannot be in the table 46 on processor 20.

Figure 3:
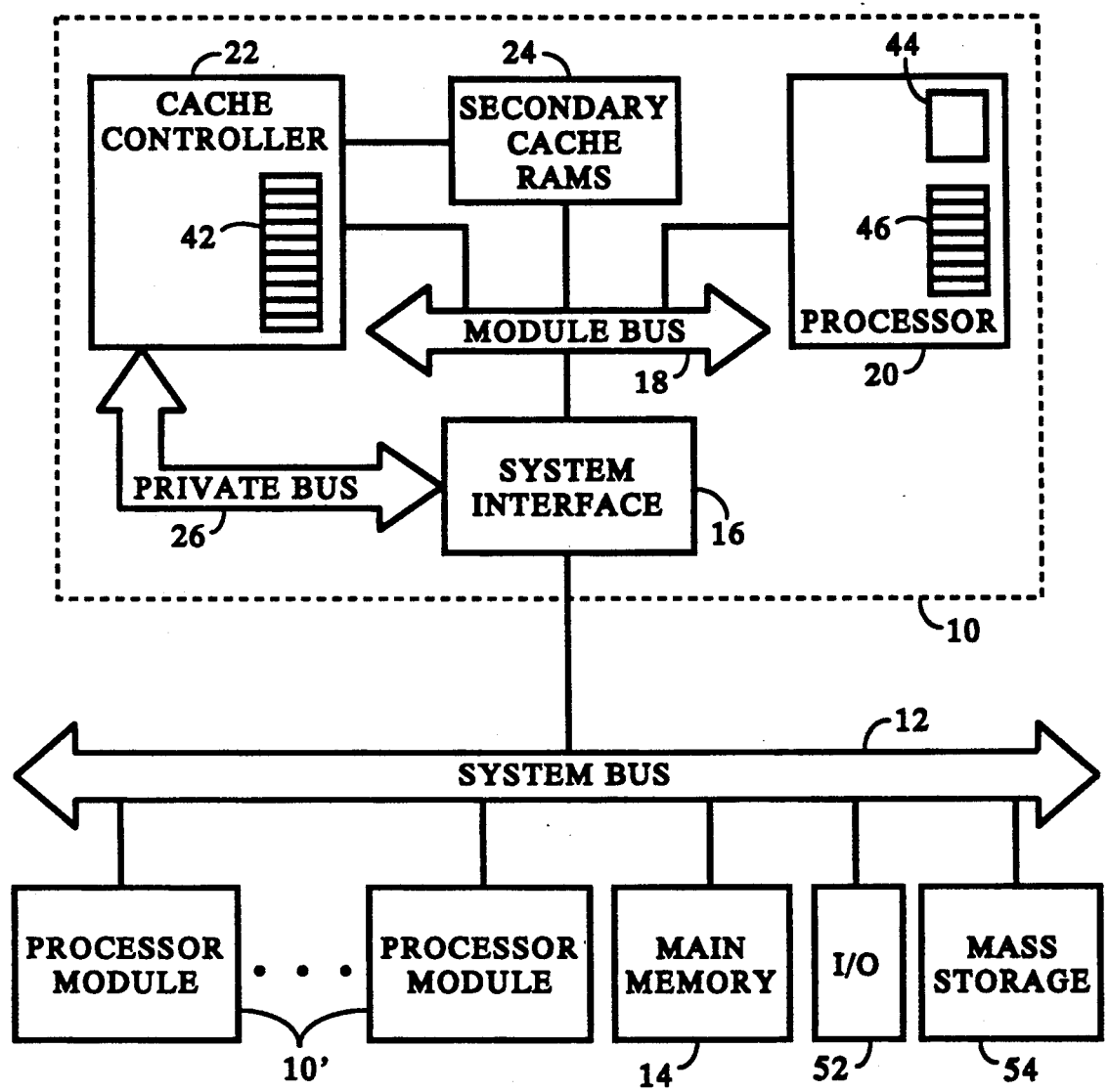
FIG. 3 is a block diagram of the multiprocessor computer system of FIG. 2 with a special purpose bus added.

A further refinement of the invalidate filtering mechanism is shown in FIG. 3. It was noted above that the invalidate request was sent from system interface 16 to cache controller 22 over module bus 18, and that some invalidate requests result in no action. This transmission, over module bus 18, of invalidate requests which result in no action, can be eliminated by inserting private bus 26 between system interface 16 and cache controller 22. Private bus 26, unlike a system bus or a module bus carries transactions only from one system component to another, in this case the components being the cache controller 22 and the system interface 16. Additionally, private bus 26 can be designed to carry only certain types of transactions, such as invalidate requests and acknowledgments that a main memory address has been found in table 42.

Thus, if system interface 16 detects a transaction on system bus 12 that requires the issuance of an invalidate request, it issues the invalidate request directly to cache controller 22 over private bus 26. The cache controller 22 searches table 42 for the main memory address of the item to be invalidated, and proceeds as described in connection with FIG. 2. Note that, with the addition of private bus 26, only invalidate requests for main memory addresses that are present in table 42 generate any transactions on module bus 18; if processor 20 has no primary cache, invalidate requests do not need to be transmitted over the module bus at all.

Transmission of the invalidate request from system interface 16 to cache controller 22 typically involves sending a signal from one chip to another. This is very slow relative to communication within a single chip. In addition, other processor modules 10' or other systems elements may issue many transactions requiring invalidate requests. Therefore, system interface 16 may detect a second transaction on system bus 12 that requires the issuance of a second invalidate request before the first invalidate request has been transmitted or processed. Since system interface 16 has not completed transmitting the first invalidate request, it cannot accept the second invalidate request, and must request that the other processor modules 10' slow down or stop until it can process the invalidate request. This slows down system performance.

Figure 4:
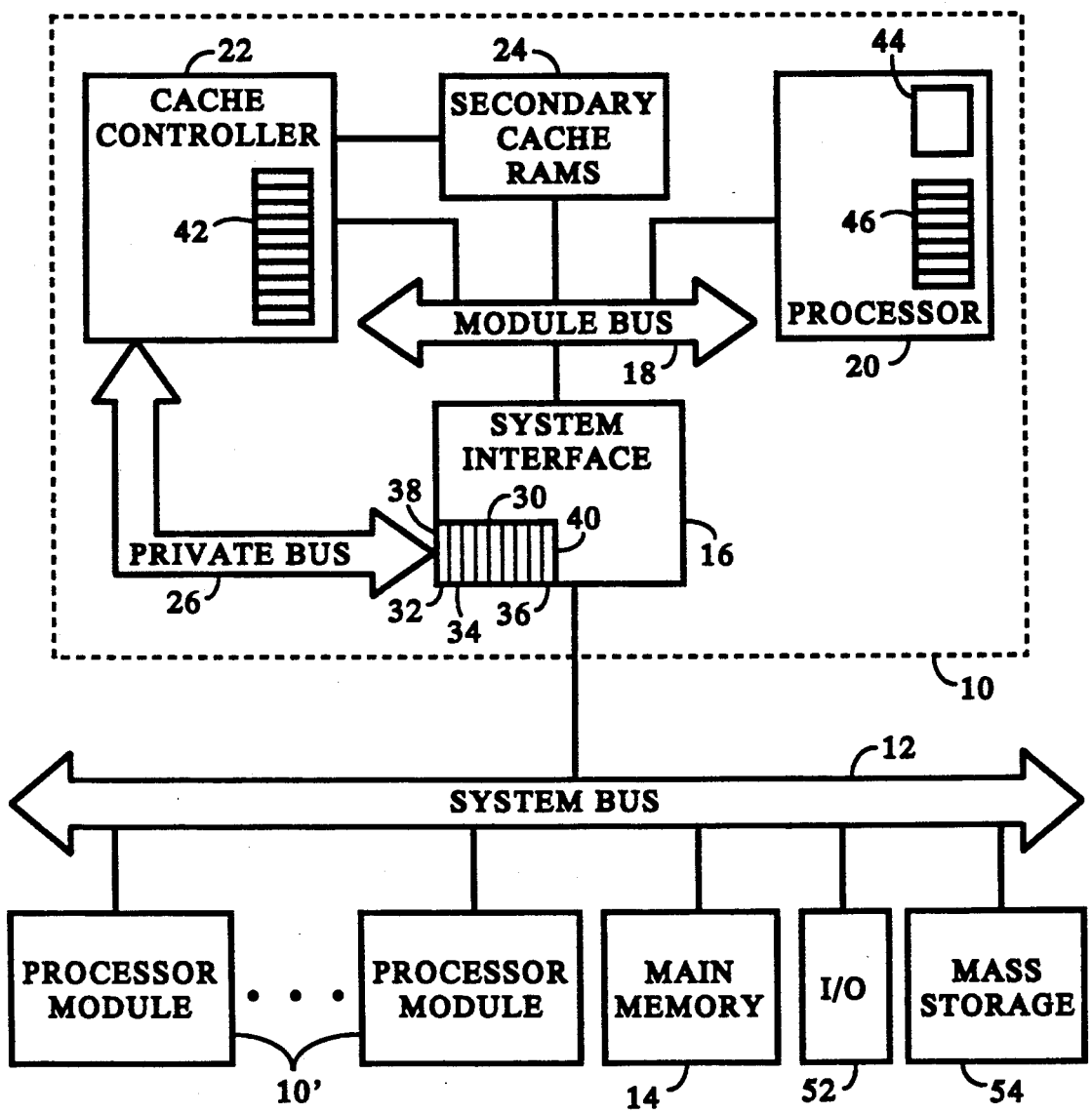
FIG. 4 is a block diagram of the multiprocessor computer system of FIG. 3, with an invalidate queue added.

One method of avoiding this slowdown is by adding an invalidate request queue 30 as shown in FIG. 4. When system interface 16 detects a transaction requiring the issuance of a first invalidate request, it places the first invalidate request in first entry 32 of invalidate request queue 30. System interface 16 transmits a copy of the invalidate request in first entry 32 of invalidate queue 30 to cache controller 22 for processing. If a second transaction requiring an invalidate request is detected by system interface 16 before cache controller 22 has finished processing the first invalidate request, system interface 16 generates a second invalidate request and places the second invalidate request in second entry 34 of invalidate request queue 30. Subsequent invalidate requests are placed in the remaining entries in invalidate request queue 30. Only when the last entry 36 of queue 30 is filled does the system interface 16 need to request that the other processors slow down or stop. When cache controller 22 has completed processing the first invalidate request, system interface 16 moves the invalidate request in second entry 34 of invalidate request queue 30 to the first entry 32 of invalidate request and sends the new content of first entry 32 to cache controller for processing. Similarly, the remaining entries of invalidate request queue 30 are moved forward toward the front 38 of the invalidate request queue 30.

Processing of the invalidate requests takes place when cache controller 22 is otherwise idle. The invalidate request processing system operates most efficiently if an invalidate request is immediately available for processing whenever cache controller 22 is otherwise idle. However, moving the invalidate request from the queue 30 on system interface 16 to cache controller 22 may involve communication from chip to chip, which, as noted above, is slow relative to communication within one chip. Therefore, by the time cache controller 22 notifies system interface 16 that it is idle, and system interface 16 sends an invalidate request to cache controller 22, a request from processor 20 may have arrived at cache controller 22. The cache controller 22 would no longer be idle, and an opportunity to process an invalidate request would have been lost, resulting in a loss of system efficiency.

Figure 5:
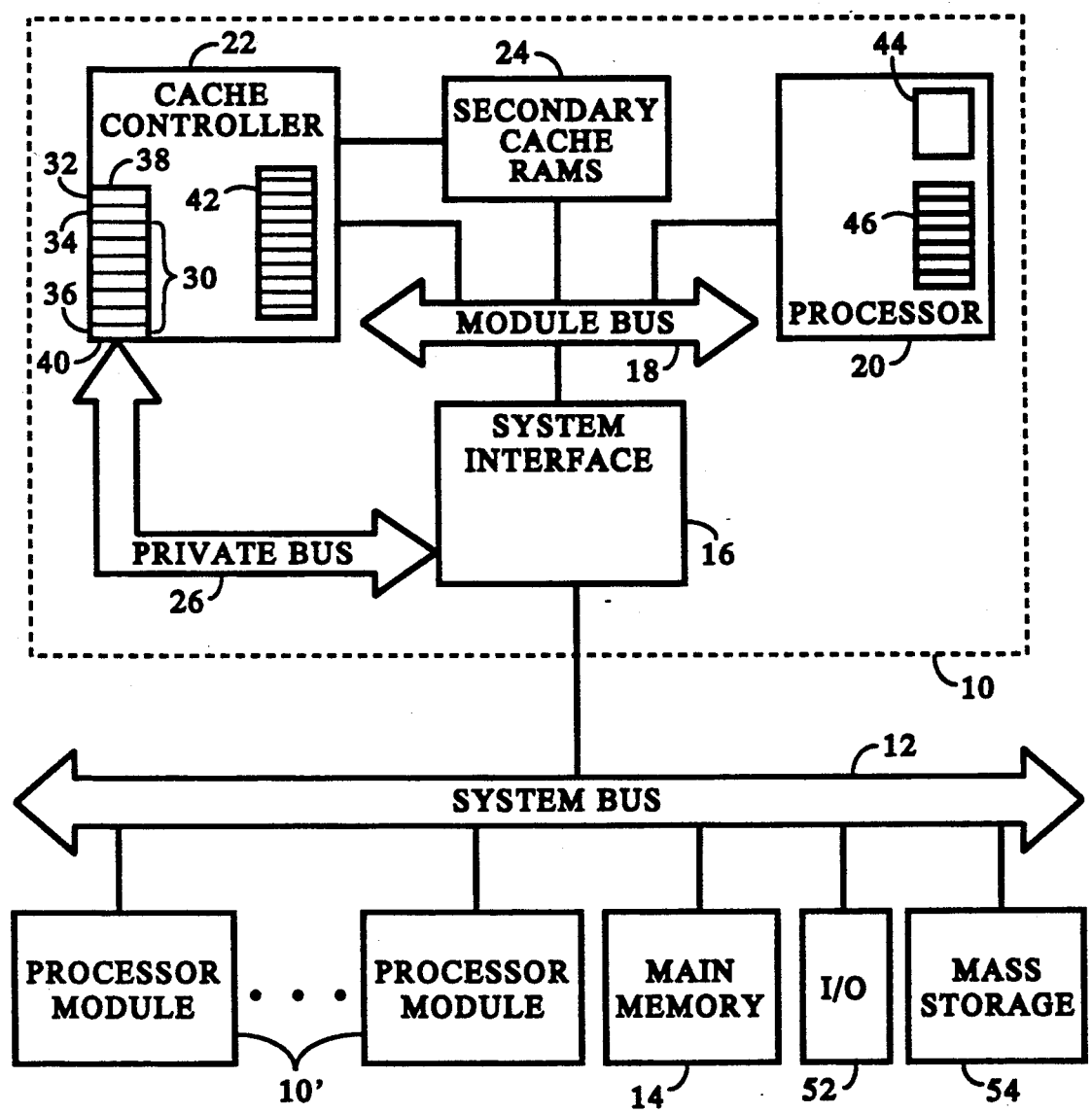
FIG. 5 is a block diagram of the multiprocessor computer system of FIG. 4, with the invalidate queue placed on a different component of the processor module.

This loss of efficiency can be eliminated by placing invalidate queue 30 on cache controller 22, as shown in FIG. 5. First entry 32 of queue 30 is now immediately available to cache controller 22 for processing whenever cache controller 22 is idle.

Figure 6:
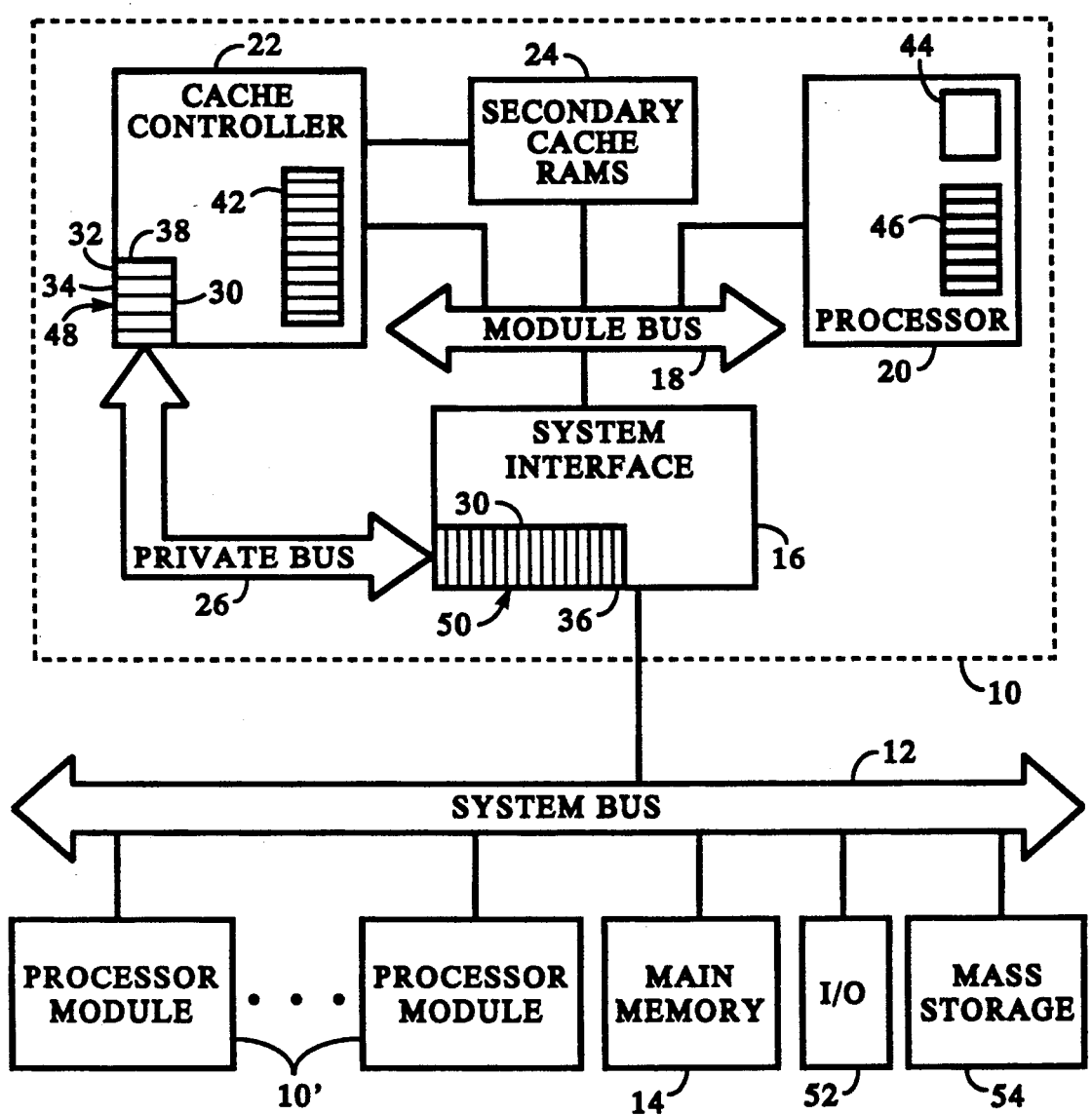
FIG. 6 is a block diagram of the multiprocessor computer system of FIG. 5 with a second invalidate queue added.

Additional advantages can be attained by dividing the invalidate request queue into two sections, as illustrated in FIG. 6. First entry 32 of queue 30 is immediately available to cache controller 22 for processing whenever cache controller 22 is idle. Portion 50 of queue 30 on system interface 16 allows system interface 16 to be aware, without the need for chip to chip communication, if queue 30 is full, thereby requiring system interface 16 to request that other system components slow activity or stop. Additionally, having a portion 50 of queue 30 on system interface 16 allows system interface 16 to receive a new invalidate request while it is transferring a previous invalidate request from system interface 16 to cache controller 22.

Splitting of queue 30 also allows private bus 26 to be narrower, thereby using fewer of the input channels ("pins") of cache controller 22. Invalidate requests can be split into two portions by system interface 16. The two portions may be transmitted sequentially, and recombined in the cache controller 22. This is impractical without a queue on both system interface 16 and cache controller 22, since otherwise splitting the invalidate request would double the time necessary to transmit the invalidate request.

An important consideration is how many spaces should be available in the queue 30. There must be an adequate number of positions on the first portion 48 of queue 30 on cache controller 22 to minimize the instances in which cache controller 22 has to "wait" for an invalidate request. There must be an adequate number of positions on the second portion 50 of queue 30 on system interface 16 so that second portion 50 does not fill up while transferring invalidate requests to cache controller 22. The total number of positions in queue 30 must be adequate to ensure that queue 30 does not fill up, thereby slowing system performance. The maximum number of positions in each of sections 48 and 50 of queue 30 is a function of the space available on the chip on which the portion of the queue resides. The number of spaces is optimized by design considerations and the use of computer simulations. In the best mode known to the inventors, there are five positions of first portion 48 of queue 30 on cache controller 22, and there are sixteen positions on second portion 50 of queue 30 on system interface 16.

For clarity of explanation, the operation of invalidate request queue 30 has been described above as if the contents of entries are "moved" from one queue position to another as invalidate requests are processed. While this explains the logical operation of invalidate request queue 30, those skilled in the art will understand that queues are most commonly implemented as a set of registers, with two circular pointers. One of the two circular pointers points to the head of the queue, the other pointer points to the tail of the queue. As an entry in the queue is processed, the head of queue pointer moves to the next entry.

In the best mode known to the inventors, the two portions of the queue 30 are FIFO (first in - first out) structures implemented with a buffer at the input pins, and enough registers so that the buffer plus the number of registers is equal to the desired number of positions in the portion in the queue 30. Each of the two portions 48 and 50 of the queue 30 is implemented with two circulating pointers, one of which points to the register containing the head of the queue, and one pointer that points to the next register to be written to from the buffer. The use of circulating pointers in FIFO stacks is well known in the art.

Figure 7:
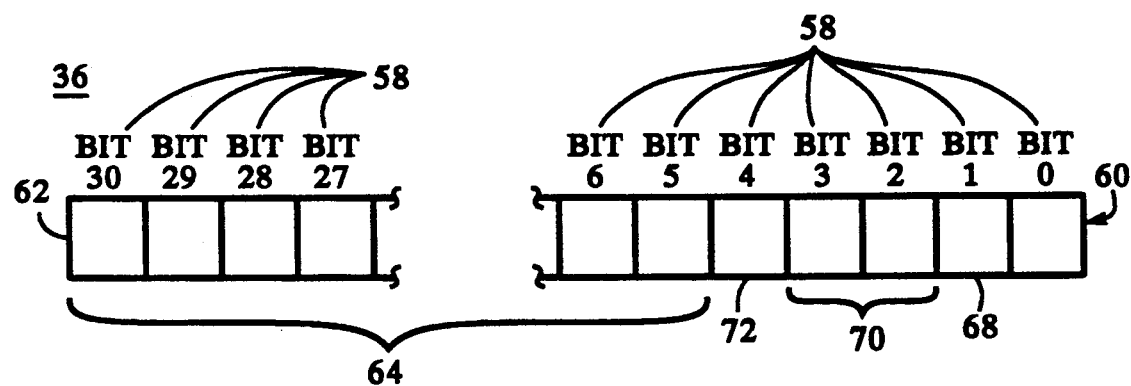
FIG. 7 is a diagram of a single entry in the invalidate queue.

The operation of the invalidate queue can be still better understood by reference to FIG. 7, which is a diagram of a single entry 36 in invalidate queue 30, and to FIG. 6. Single entry 36 comprises a register containing thirty one bit positions 58. Bit positions 58 are identified by number. In one common numbering scheme, the rightmost bit 60 is identified as bit zero, and the leftmost bit 62 is identified as bit thirty.

Address bits 64 (bit positions 5 through 30) contain the main memory address of the item to be invalidated.

Invalidate queue valid bit 60 (bit position 0) indicates whether table 42 has been searched for the address contained in address bits 64. When invalidate queue valid bit 60 is "valid", there is a valid entry in that position of invalidate queue 30. When cache controller 22 begins to search table 42 for the address contained in address bits 64, cache controller 22 changes invalidate queue valid bit to "invalid". If invalidate queue valid bit 60 of first entry 32 of queue 30 is "invalid", the queue is empty.

Flush bit 68 (bit position 1) is used to synchronize the processing of the invalidate request with the processing of other transactions in the computer. This synchronization method is described generally in U.S. patent application Ser. No. 07/212,416, filed Jun. 27, 1988 by Durdan, et al, entitled "Method and Apparatus for Filtering Invalidate Requests" and assigned to the assignee of the present application, and more specifically in U.S. patent application Ser. No. 07/591,199 (pending), filed Oct. 1, 1990, Callander et al, entitled "A Two-Level Protocol for Multi-Component Bus Ownership, and Implement in a Multi-Processor Cache Write Back Protocol" and assigned to the assignee of the current application.

Parity bits 70 (bit positions 2 and 3) are used for parity checking, which is well known in the art. Two parity bits are provided in order to allow for splitting the address bits 64 into two portions and transmitting the address bits 64 from the system interface 16 to the cache controller 22 in two cycles, as mentioned in the discussion of FIG. 4.

Invalidate command bit 72 (bit position 4) indicates whether the invalidate request resulted from a write request or a read request. The actions taken by the cache controller 16 or the processor 20 depends on the status of invalidate command bit 72, and on the status of the dirty and valid indicators in the entry in table 42 for address bits 64 .

If invalidate command bit 72 indicates that the invalidate command resulted from a read request, cache controller 16 examines table 42 to see if the address to be invalidated is "clean" or "dirty".

If the address is "clean", then, so far as that processor module 10 is concerned, the contents of main memory 14 are current, and cache controller 16 takes no further action. If the address is "dirty", cache controller 16 writes the contents of the address back to main memory 14 and changes the "dirty" indicator to "clean".

If the invalidate command bit 72 indicates that the invalidate command resulted from a write request, cache controller 16 examines table 42 to see if the address to be invalidated is "clean" or "dirty".

If the address is "clean", cache controller 16 changes the valid/invalid indicator of the entry in table 42 to "invalid". If the address is "dirty", cache controller 16 writes the contents of the address back to main memory 14, changes the "valid" indicator to "invalid", and changes the "dirty" indicator to "clean".

The invention having thus been described, it will be apparent to those skilled in the art that the invention may be practiced in ways other than as specifically described, while remaining within the spirit and scope of the invention as described in the appended claims.

We claim:

1. Apparatus comprising:
   a cache memory;
   a module bus coupled to said cache memory
   recording means, coupled to said module bus, for recording a main memory address of entries in said cache memory;
   monitoring means coupled to said module bus for monitoring transactions on a system bus that require an issuance of an invalidate request;
   issuing means, coupled to said module bus including at least a main memory address;
   determining means for determining if said main memory address of said invalidate request corresponds to a main memory address in said recording means; and
   storing means for storing said invalidate requests, said storing means having a first portion disposed in said issuing means and a second portion disposed in said determining means.

2. Apparatus as in claim 1, wherein said cache memory is a writeback cache.

3. Apparatus as in claim 2, further comprising:
   a system processor;
   a system bus coupled to said system processor and to said monitoring means;
   a main memory coupled to said system processor by said system bus;
   wherein said monitoring means monitors transactions on said system bus for transactions requiring that the contents of a portion of said cache memory be written to said main memory.

4. A method comprising the steps of:
   providing a first cache memory including entries for data read from a main memory address;
   recording said main memory address of each of said cache entries in a second cache memory;
   executing instructions in a system interface coupled to a system bus for monitoring transactions on said system bus and issuing invalidate requests containing at least a main memory address, for those monitored transactions requiring said processor to issue an invalidate request;
   storing said issued invalidate request in a storage means, said storage means having a first portion disposed in said system interface; and
   executing instructions in a controller that controls reading and writing to said first cache for determining if said main memory address of said invalidate request corresponds to said main memory address of at least one of said entries in said cache memory with said controller including a second portion of said storage means.

5. A method as in claim 4, wherein said first portion of said storage means transmits invalidate requests to said second portion of said storage means over a dedicated plurality of signal lines.

6. A method as in claim 4, further comprising the step of monitoring transactions on a system bus for transactions requiring that a plurality of said cache entries of said cache memory be written to a main memory.

7. An invalidate request storage device, comprising:
   a first group of storage devices to store invalidate requests, said first group of said storage devices disposed in a first semiconductor chip, and a second group of storage devices that can store invalidate requests disposed in a second semiconductor chip; and
   a dedicated plurality of signal lines coupled to each of said groups of storage devices wherein each invalidate request can be moved between said first group of storage devices and said second group of storage devices over said dedicated plurality of signal lines.

8. An invalidate request storage device as in claim 7, wherein said first semiconductor chip comprises a cache memory controller.

9. An invalidate request storage device as in claim 7, wherein said second semiconductor chip comprises a system interface unit.

10. An invalidate request storage device as in claim 7, wherein said first semiconductor chip comprises a cache memory controller and said second semiconductor chip comprises a system interface unit.

11. A multiprocessor computer comprising:
    a main memory;
    a system bus coupled to said main memory;
    a plurality of processor modules coupled to said system bus, with each of said processor modules further comprising:
      an invalidate queue having a first portion and a second portion to store a plurality of invalidate requests;
      a system interface coupled to said system bus, including:
        monitoring means for monitoring transactions on said system bus for transactions requiring an invalidate request;
        said first portion of said invalidate queue;
        a dedicated plurality of signal lines;
        a cache controller including said second portion of said invalidate queue coupled to said first portion of said invalidate queue by said dedicated plurality of signal lines.

12. The apparatus of claim 11, wherein an invalidate request from said first portion of said invalidate queue is transferred to said second portion of said invalidate queue over said dedicated plurality of signal lines.

13. The apparatus of claim 11, wherein each of said processor modules further comprises:
    a module bus coupled to said cache controller and said system interface;
    a cache memory coupled to said module bus comprising a plurality of cache entries associated with a main memory address; and
    storing means for storing said main memory address for each of said cache entries.

14. The apparatus of claim 13, wherein said system interface of each processor module further comprises issuing means, responsive to said monitoring means, for issuing said plurality of invalidate requests, each of said invalidate requests including at least a memory address.

15. The apparatus of claim 13 further comprising determining means for determining if said memory address of one of said plurality of invalidate requests stored in said invalidate queue corresponds to at least one of said main memory addresses stored in said storing means.

* * * * *